United States Patent [19]

Enderle

[11] Patent Number: 5,165,228
[45] Date of Patent: Nov. 24, 1992

[54] TURBORAMJET ENGINE

[75] Inventor: Heinrich Enderle, Gröbenzell, Fed. Rep. of Germany

[73] Assignee: MTU Motoren- Und Turbinen-Union Munchen GmbH, Fed. Rep. of Germany

[21] Appl. No.: 654,195

[22] Filed: Feb. 12, 1991

[30] Foreign Application Priority Data

Feb. 13, 1990 [DE] Fed. Rep. of Germany ....... 4004416

[51] Int. Cl.⁵ .............................................. F02K 3/00
[52] U.S. Cl. .................................. 60/244; 60/270.1; 137/15.1
[58] Field of Search ............. 60/244, 245, 225, 270.1; 137/15.1, 15.2

[56] References Cited

U.S. PATENT DOCUMENTS

| 2,970,431 | 2/1961 | Harshman | 60/244 |
| 3,153,904 | 10/1964 | Ellis et al. | 60/244 |
| 3,490,472 | 1/1970 | Dawson et al. | 137/15.1 |
| 3,568,694 | 5/1971 | Johnson | 137/15.1 |
| 4,477,039 | 10/1984 | Boulton et al. | 137/15.1 |

FOREIGN PATENT DOCUMENTS

| 392527 | 4/1990 | European Pat. Off. | 60/244 |
| 1131467 | 6/1962 | Fed. Rep. of Germany | 60/244 |

Primary Examiner—Richard A. Bertsch
Assistant Examiner—Michael I. Kocharov
Attorney, Agent, or Firm—Evenson, Wands, Edwards, Lenahan & McKeown

[57] ABSTRACT

Turboramjet engine having a variable air intake, a ram air duct annularly enveloping the basic turbojet engine, and shutoff devices with which the ram air duct is energized with air when the basic turbojet engine is shut off and with which the basic turbojet engine is energized with air when the ram air duct is shut off. An air tract communicates with the air intake on a tubular duct carried axially on the basic turbojet engine and expands to an annular inlet section to the ram air duct. The shutoff devices are associated at least on the inlet side with quadrilateral sections of the tubular duct. As shutoff means for the inlet flow, use is made of an axially adjustable and internally swept sleeve valve and at least one flap that can be pivoted against a partial inlet area of the inlet section, which flap seals off the sleeve valve in lid-fashion when the inlet section is in a jointly exposed position.

20 Claims, 11 Drawing Sheets

FIG.IA
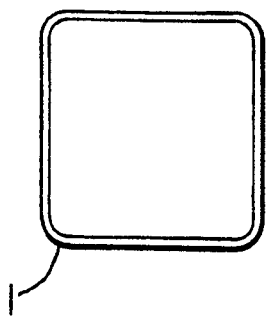
FIG.IB
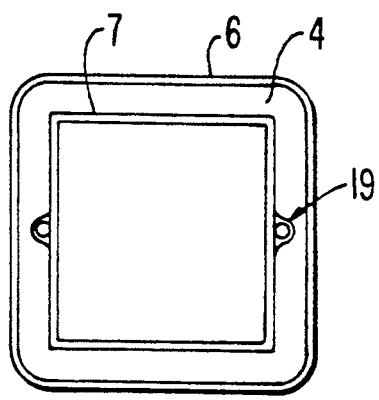
FIG.IC
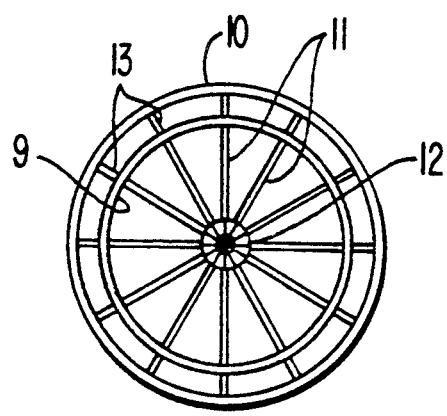

TURBORAMJET ENGINE

BACKGROUND AND SUMMARY OF THE INVENTION

This invention relates to a turboramjet engine having a variable air intake, a ram air duct annularly enveloping the basic turbojet engine, and shutoff means to energize the ram air duct with air when the basic turbojet engine is shut off and the basic turbojet engine when the ram air duct is shut off.

Combined turbojet-ramjet (turboramjet) engines have lately attracted renewed interest in connection with hypersonic flight concepts for an extremely wide mission spectrum reaching from takeoff to high supersonic speed at high altitudes (to about 30 km). The hypersonic concept also includes a space vehicle concept (Saenger project) involving a two-stage concept as described below. The first stage is to be implemented by a vehicle operating solely within the atmosphere, while the second stage is based on a payload vehicle riding piggyback on said first vehicle and continuing its assigned trajectory in the upper region of the atmosphere by means of a suitable rocket propulsion system to perform space missions. The vehicle for the first stage is therefore recoverable and reusable, and it makes takeoffs and landings like a conventional aircraft.

On a turboramjet engine to be used for, e.g., such a vehicle, the basic turbojet engine is generally cut out continuously when a flight speed of Mach 3 is reached and the respective ramjet engine is cut in continuously to solely achieve the desired high supersonic or hypersonic speeds of up to Mach 4.5 or even higher. Airspeeds of about Mach 2 or even higher can here be achieved in combined "turbojet plus afterburner selected" operation; where the afterburner is advantageously arranged immediately downstream of the basic turbine engine and normally energized with compressor or fan air and engine exhaust gas in combination, and where with the basic turbojet engine cut out the afterburner forms the ramjet engine propulsion system, where additional fuel injection means and flame stabilizers are cut in and suitably metered ambient air is supplied as the only air source. With a suitably adapted intake and exhaust nozzle geometry such an engine thus cuts out or deactivates the basic turbojet engine in hypersonic operation, where the outer ram air duct is then energized with the requisite amount of ram air to be admitted into the additional combustion chamber for ramjet operation at a point, e.g., downstream of the basic turbojet engine end.

In this arrangement the necessary shutoff devices of the basic turbojet engine for the ramjet mode and of the ram air duct for the basic turbojet engine mode are gaining vital importance. In the shutoff or locked position of the basic turbojet engine during ramjet operation the basic engine should be compromised as little as possible by the comparatively high temperatures of the ram air (about 1700° C. and above); which applies to the shutoff devices proper, but importantly also to the actuating and adjustment systems needed to operate the shutoff devices. Also the actuating and adjustment systems should preferably not aerodynamically disturb the ambient air ingested by the basic engine compressor.

It must also be ensured that as the case may be, as perhaps in subsonic operation or in hypersonic operation, optimum and aerodynamically clean admission of air from the engine intake into the basic turbojet engine, or alternatively ramjet air admission into the ram air duct, is achieved in the respective proportionate amounts needed.

Apart from the problems outlined above, special importance is accorded the control of the proper transition phases from the basic turbojet engine operation to the ramjet operation, or vice versa, where the changeover phases should not be jerky, but rather continuously consistent to permit aero-thermodynamically effective and economical operation of the overall engine over all operating conditions. Accordingly it becomes necessary, e.g. during a changeover phase from basic turbojet engine operation to ramjet operation to have a sufficiently large amount of intake air still available for permitting the basic turbojet engine to coast down, while on the other hand a comparatively large amount of ram air would have to be delivered into the ram air duct already at the beginning of the ramjet mode. In the reverse case of ramjet operation on a basic turbojet engine base—conceivably with afterburning, an abrupt flameout of the ramjet combustion chamber must initially be prevented, although sufficient intake air supply must nevertheless be available already when the basic engine is cut in.

For closing or opening the air supply to the basic turbojet engine to support the one case or the other, the use of teardrop centerbodies axially adjustable along the engine centerline has previously been proposed in combination with, e.g., axially adjustable sleeve valves serving to open or close as required the supply of ram air to the ram air duct in response to the adjustment action of the centerbody. This concept involves comparative great overall length plus considerable constructional expansion of the entire engine plant circumferentially to ensure the requisite air admission areas and paths into the ram air duct, and especially to the compressor of the basic engine—which would here be downstream of the major diameter of the centerbody with a view mainly to the necessary flow velocities and Mach numbers—are available. Such constructional circumferential expansion disadvantageously involves aggravated frontal area drag and component weight, where the latter is attributable also to the design of the centerbody proper. A centerbody of this design, whether it be axially adjustable or stationary, invariably causes disturbance and aerodynamic losses, especially in the position in which the intake air supply is admitted into the compressor of the basic turbojet engine.

An object of the present invention is to satisfy the aforementioned requirements for a turboramjet engine are by means of minimized constructional complexity, compact dimensions and maximum simplicity of the shutoff, adjustment and actuating devices.

This object is achieved by the present invention by providing an engine of the generic description wherein an air tract which communicates with the air intake and is arranged on a tubular duct carried axially towards the basic turbojet engine is expanded to an annular inlet section of the ram air duct, wherein the shutoff means are associated with quadrilateral sections of the tubular duct which are quadrilateral at least on the inlet side, and wherein the shutoff means of the inlet section are represented by an axially adjustable, internally swept sleeve valve and at least one flap which can be pivoted against a partial inlet of the inlet section, said flap closing off the sleeve valve lid-fashion in a jointly exposed position of the inlet section.

In the arrangements according to the invention, a turboramjet engine is provided which has comparatively compact changeover means to switch between turbojet and ramjet modes of operation. This advantageously eliminates all aerodynamic disturbances in turbojet operation. In accordance with preferred embodiments of the present invention at least one flap is pivoted, in the turbojet operating phase, against a wall of the upstream quadrilateral duct section (inlet flow duct section) of the air tract in an essentially horizontal and aerodynamically flush arrangement, where it shuts off a locally associated partial inlet flow area leading into the annular inlet section; while the remaining inlet areas are shut off by the annular, quadrilateral, or square or rectangular sleeve valve, which with a cross wall is located below the flap. Links, if used to actuate the flap when the sleeve valve is adjusted axially, are arranged, e.g., laterally inside the sleeve valve to prevent them from disturbing the intake airflow to the compressor of the basic turbojet engine.

When the basic turbojet engine is shut off to permit ramjet operation, the sleeve valve is deployed into the upstream end of the inner shield wall of the air tract, when the sleeve valve and with it the basic engine, are sealed off lid-fashion. In connection with the expansion of the quadrilateral inlet duct section relative to the inner shield wall, where in accordance with the present invention the expansion takes the shape of a slipover sleeve and both components together form the annular inlet duct to the ram air duct, a relatively large needed inlet flow area to the inlet section is exposed for free flow all around, particularly so in combination with a shutoff position of the flap extending transversely and obliquely to the extended engine centerline and accordingly obliquely adapted open position of partial flow areas on mutually oppositely arranged sides of the duct. In the shutoff position the links, or similar flap actuating means are arranged behind the flap, where they are well protected from the hot ram air stream. The exemplary single flap-like shutoff or sealing member, provides a smooth surface area and a snug faying fit for the shutoff position. It also readily permits of cooling without appreciable complexity of construction, and is conceivably used in conjunction with a thermally well-insulating ceramic and/or carbon fiber-reinforced material for the flap. For adjusting the flap the present invention provides an actuating device arranged centrally on the engine. Alternatively, two actuating devices are arranged oppositely from each other on the duct wall and preferably act on the actuating side of the sleeve valve. The actuating devices are advantageously arranged, especially when used multiply, for thermal protection on the inner shield wall in the inlet section or in the ram air duct, in which they would be partitioned off such that the actuating means will not obstruct the intake air flow during basic turbojet engine operation.

In combination with links arranged between the sleeve valve and at least one flap as intended in a further aspect of the present invention the overall inlet flow area to the annular inlet section of the ram air duct can, e.g. when the changeover is made from turbojet to ramjet operation, invariably be opened faster than the basic engine is sealed off by the flap at the sleeve valve. This is attributable also to the relatively short axial actuating movement the valve needs to expose the necessary inlet flow area to the inlet section of the ram air duct. When in other words ramjet operation is selected, e.g., an additional, sufficiently large inlet flow area to the inlet section of the ram air duct can be provided while the inlet flow area to the basic engine is still sufficient to permit continuously consistent coastdown of the basic engine. By suitably changing the length of links and their hinge position, several different operationally desirable variations of the respective required inlet flow area ratios (basic engine/ramjet operation) can be achieved during a changeover.

The above-mentioned advantageous criteria and features of the present invention apply similarly also if a two-flap concept is selected to implement them, where the respective annular as well as square or rectangular, or annularly box-shaped sleeve valve is sealed off by two folded flaps which in symmetrically pointed roof-shape configuration face the ram air flow when the basic turbojet engine is shut off.

Substantial advantages over the single-flap concept are found for example, in reduced overall length of the entire changeover system and in the fact that it permits—from the flow area aspect—symmetrical and aerodynamically especially favorable splitting of the ram air flowing into the annular inlet section. Also, the extremely short overall length of the changeover system associated with the two-flap concept does not involve constructional restraints on the compressor inlet geometry of the basic turbojet engine.

In the interest of low changeover forces, the present invention also assumes pressures to be balanced during the changeover phase in the ram air duct on the one hand and in the upstream section of the air tract plus the adjoining intake section on the other. The approximate pressure equilibrium can also prevail during ramjet operation in accordance with the present invention, but in the shutoff turbojet engine a moderate amount of positive pressure should advantageously be built to prevent the ingress of hot inlet flow air into the turbojet engine.

During straight basic turbojet operation a respective horizontally pivotable flap is subjected on both sides to approximately balanced pressures because the pressure prevailing in the annular inlet section acts in the ram air duct outside on axially short flap areas only, while the entire inner surface of the flap is exposed to th comparatively lower pressure from the intake air flow.

The pressure in the ram air duct is that prevailing downstream of the turbine of the basic turbojet engine at the hot gas exit with the hot gas valve of the basic turbojet engine opened in the connection path with the downstream end of the ram air duct. The invention assumes that also the downstream hot gas or nozzle-like exit end of the basic turbojet engine must alternatively be opened or shut off with a view to the turbojet/ramjet modes.

The sleeve valve conceived by the present invention represents a stable annular component strengthwise, which can be moved axially, along the direction of flow, with little if any appreciable effort; the external pressures acting on it in the shutoff position being absorbed by the valve proper.

In accordance with the present invention the entire air tract plus shutoff means, including the at least one flap plus sleeve valve, can be arranged as a relatively light-weight and short interchangeable module between an inlet flow duct arriving from the overall engine intake and respective walls or shrouds on the inlet side (basic engine, ram air duct).

The engine changeover and shutoff mechanism thus is characterized by comparatively little weight, extremely short sleeve valve travels, favorable support and guidance of the moving parts, low actuating force requirements at all changeover phases and favorable mutual synchronization of sleeve valve/flap(s) movements in keeping with said requirements. With but a single actuating system the changeover phases from one operating mode to the other can be initiated without risk using the respective momentarily needed duct or inlet flow areas for ram air (ramjet operation) or ingested ambient air (turbojet operation), with no special control provisions being required.

Other objects, advantages and novel features of the present invention will become apparent from the following detailed description of the invention when considered in conjunction with the accompanying drawings.

BRIEF DESCRIPTION OF THE DRAWINGS

FIG. 1A is a schematic partial sectional view taken along line A—A of FIG. 1;

FIG. 1B is a schematic partial sectional view taken along line B—B of FIG. 1;

FIG. 1C is a sectional view taken along line C—C of FIG. 1;

DETAILED DESCRIPTION OF THE DRAWINGS

Figure 1:
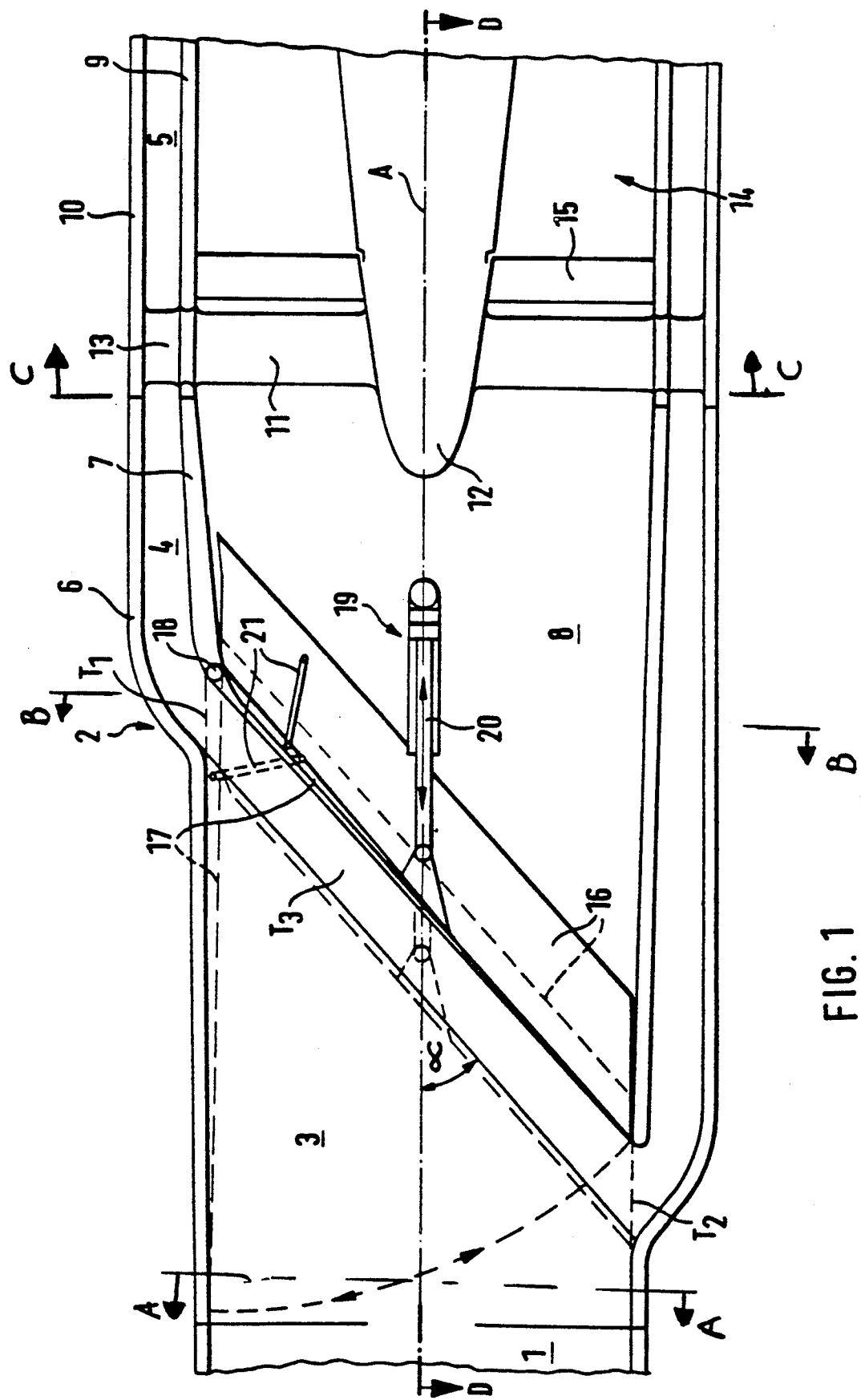
FIG. 1 is a schematic elevation view illustrating an air tract with shutoff apparatus in two relative extreme positions between a duct-like inlet end and an air inlet end of a turboramjet engine, constructed according to a preferred embodiment of the invention.
Figure 1E:
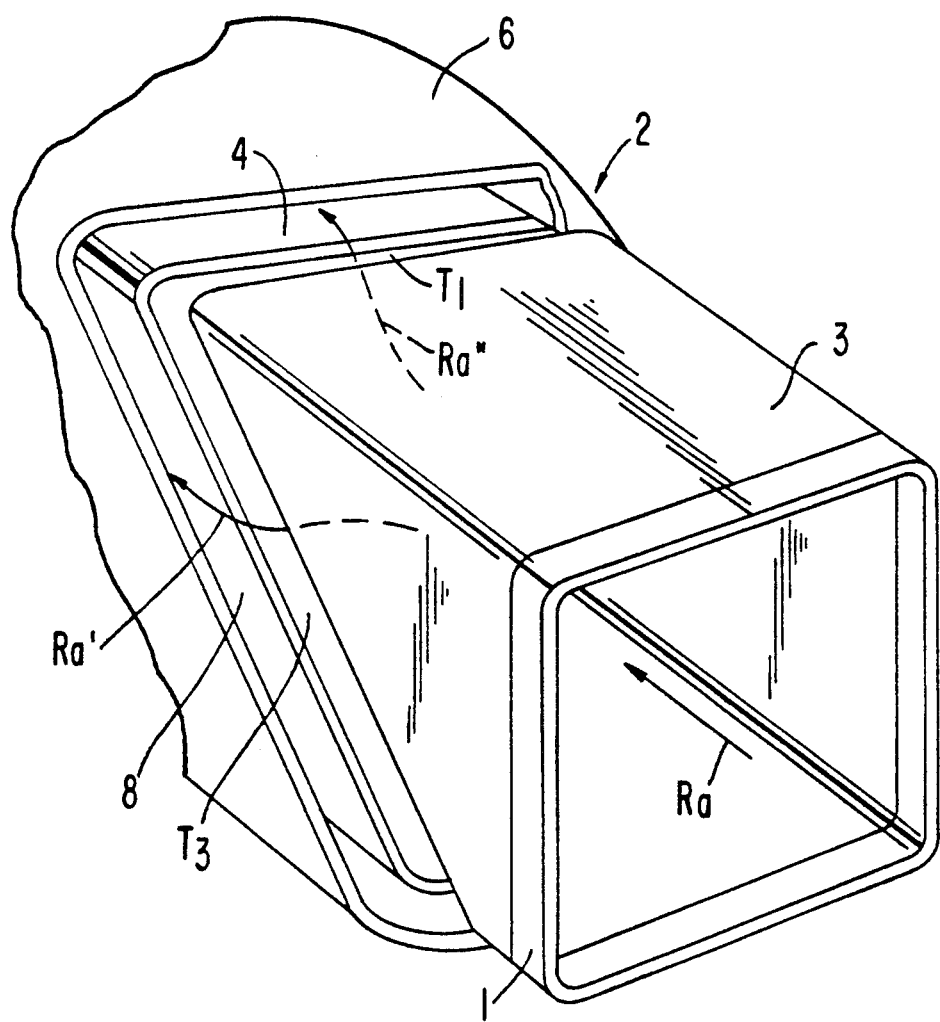
FIG. 1E is a further schematic perspective view of the arrangement of FIG. 1 in another extreme position of the valve members.
Figure 2:
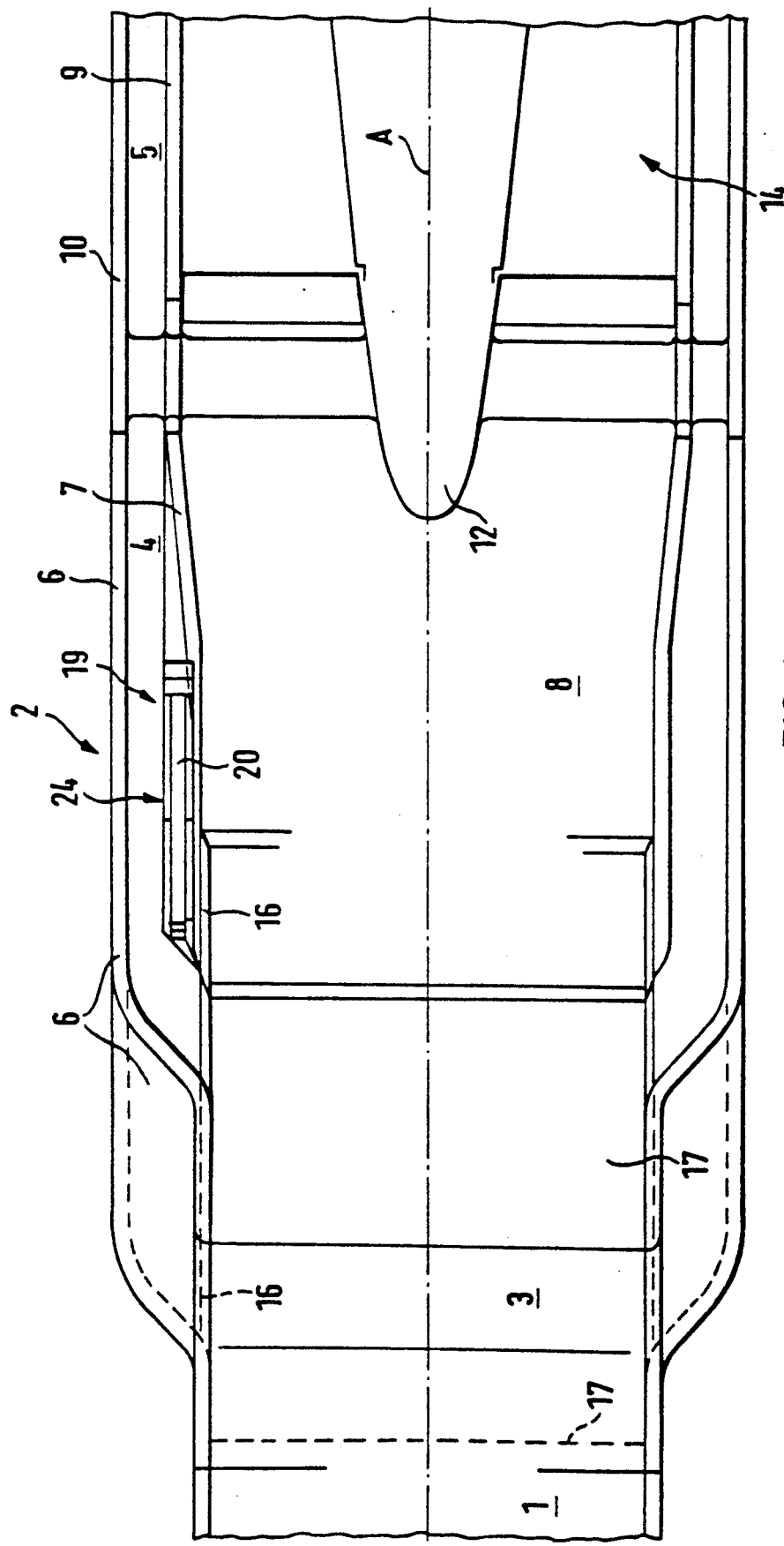
FIG. 2 is a longitudinal and transverse sectional view taken at line D—D of FIG. 1 illustrating the inlet flow end plus air tract and engine inlet end of FIG. 1.

The invention encompasses a variable air intake for the overall engine which serves to provide intake air or ram air directed to an inlet flow duct 1, said intake not being indicated on the drawings (e.g. FIG. 1). With reference now to FIGS. 1-1E and 2 the local end of inlet flow duct 1 is immediately followed by an air tract 2. The air tract 2 includes first an upstream quadrilateral, square or rectangular duct section 3 which at its front end adjoins a corresponding quadrilateral end of the inlet flow duct 1 for an aerodynamically flush fit. Forming an annular inlet section 4 issuing into an outer annular ram air duct 5 of the overall engine, the air tract 2 takes the shape of a dual housing, where an outer casing 6 uniformly expanded all around to the outer diameter of the overall engine expands sleeve-fashion from the upstream quadrilateral duct section 3 of the air duct 2. The air tract 2 also includes an inner shield wall 7, which together with the adjacent expanded section of the outer casing 6 contains the annular inlet section 4.

The shield 7 could also be termed a flow divider, which here concurrently includes a central section 8 of the basic turbojet engine. The air intake duct omitted on the drawing accordingly communicates duct-fashion with the engine end of air tract 2, which relative to the central intake section 8 of the basic engine is expanded to the annular inlet section 4 to the ram air duct 5. Looking downstream now, the annular inlet section 4 merges from its initially still quadrilateral-annular section into a circular cylindrical-annular section, with the end of the shield wall 7 on the one side and the outer casing 6 of the air tract 2 on the other being shaped to suit. The annular ram air duct 5 is formed between an inner annular shroud 9 of the basic turbojet engine and an outer annular shroud 10, the shrouds being concentric with the engine centerline. At the engine inlet end the walls and shrouds 6, 7 and 10, 9, respectively, merge one into the other for an aerodynamic flush fit. The inlet end of the basic turbojet engine includes straight struts 11 in a circumferentially equally spaced array between an engine centerbody 12 on the one side and corresponding sections of the shroud 9 on the other. Constructionally congruent struts 13 are arranged also between the outer shroud 10 of the ram air duct 5 and the respective shroud 9 of the basic turbojet engine. Arranged upstream of the entry to the compressor 14 of the basic turbojet engine are variable, again circumferentially equally spaced vanes 15.

As one of its important features the present invention provides suitable shutoff apparatus to energize with air either the ramjet air duct 5 when the basic turbojet engine is shut off, or the basic turbojet engine when the ram air duct is shut off. For this purpose, the present invention provides a sleeve valve 16 which can be adjusted axially between the duct section 3 and the inlet section 8 in flush arrangement with the wall surface, and a flap 17 arranged on the outer upper face end of the shield wall 7 for pivotal movement about a pivot axis 18 arranged transversely to the extended engine centerline A. In its first extreme position as illustrated in solid lines FIG. 1 the sleeve valve 16 is fully deployed into the shield wall or the frontal region of the intake section 8, and the flap 17 frontally closes off the valve 16 lid-fashion. In this extreme position for ramjet operation the intake duct 8 and hence the basic turbojet engine is shut off by the illustrated pivoting and shutoff position of the flap 17. In the alternative extreme position of the valve 16 and also the flap 17 as shown in broken line, the flap 17 is pivoted into an essentially horizontal position, where it here shuts off, e.g., an upper partial inlet $T_1$ to the ram air duct. In this second extreme position the sleeve valve 16 closes off mutually oppositely arranged oblique partial inlets $T_3$ on the duct side, and with its lower axial wall it simultaneously closes off the respective remaining partial inlet $T_2$ to the inlet section 4.

Figure 1D:
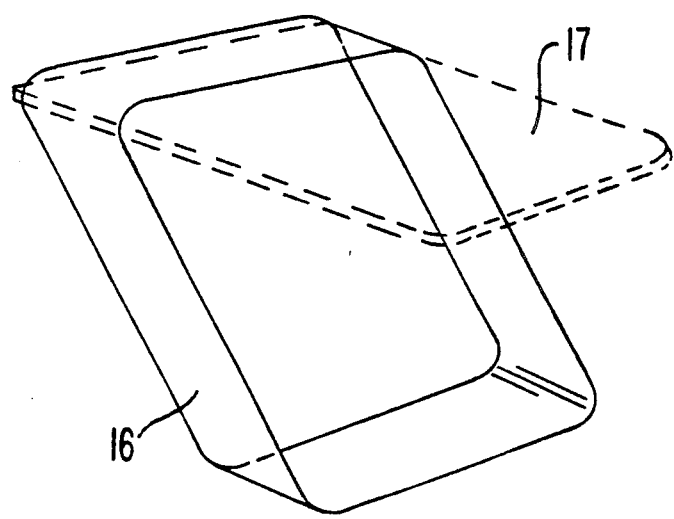
FIG. 1D is a schematic front perspective view showing the air tract of FIG. 1.

FIG. 1D is a perspective schematic view of the axially movable valve 16 with the flap 17 shown in the second extreme position closing off inlets T1, T2, T3 of the annular inlet duct 4. The valve 16 exhibits a square or rectangular ring shape with slightly rounded corners between respective straight line wall sections. The inner wall structure of the frontal intake section 8 (FIG. 1) corresponds to the outer square rectangular wall structure of the valve 16. The valve 16 fits smoothly and in a fluid tight fashion in this frontal region of intake section 8 in the first extreme position wherein the flap 17 closes off the frontal area of the valve.

FIG. 1E is a further perspective view of the arrangement of FIG. 1 as shown in a first extreme position of the valve 16 with flap 17 closing off the valve 16 and therewith the flow of air from the engine intake into the basic turbojet engine. In this position of valve 16 and flap 17 respectively, ram air Ra is divided (Ra', Ra") at said flap 17 and is flowing via the open inlet sections T1, T2, T3 of the ramjet air duct 5.

For the embodiment of FIGS. 1 and 22 the invention also embraces a feature where the upstream wall ends of the shield wall 7, of the sleeve valve 16 and of the upstream wall ends of the duct section 3 axially adjacent to said end of the shield wall 7, are bevelled at the same angle of inclination alpha ($\alpha$) with the engine centerline A. The oblique shutoff position of the flap 17 on the forward or frontal end of the sleeve valve 16 is formed in correspondence with the angle of inclination alpha $\alpha$. The rear end of the sleeve valve 16 is likewise bevelled at this angle alpha $\alpha$ at its oppositely arranged rear ends, although this is not mandatory. At its rear end the sleeve valve 16 could also be designed to form a right angle with the engine centerline A on the wall side, and such a sleeve valve could thus be termed a box-type construction. On account of the inclined positions or inclined sections (angle $\alpha$), comparatively large air inlet flow areas or partial inlet sections $T_1$, $T_2$, $T_3$ can be provided on the duct side, preferably at mutually laterally opposite sides of the air tract 2, at comparatively moderate axial adjustment travel of th sleeve valve. Then when the engine is changed from basic turbojet operation to ramjet operation, a large air supply area to the annular inlet section 4 and thus to the ram air duct can be provided relatively fast and in an aerodynamically beneficial configuration. In the initial phase of this changeover process, the flap 17 is pivoted about the axis of rotation 18 and into the flow by but a small angle of adjustment, leaving an adequately large proportion of the air available for the coast-down of the basic turbojet engine.

As it has been illustrated for clarity in solid lines in FIGS. I and 2, at least one actuating device, which may be a hydraulically o pneumatically operated ram 19, may be provided. A push-pull rod-like actuating member 20 of this ram engages at its upstream end with the sleeve valve 16 for a hinge-type connection and also outside on the duct side. The sleeve valve 16 is coupled on the inner wall side and laterally outside as shown here to the flap 17 through links 21. As will become apparent especially from FIG. 1, the links 21 are each hinged on one side to the sleeve valve 16 and on the other to the flap 17 by means of pins 22, 23 (cf. FIG. 4) such that when the shutoff means are adjusted, they can be pivoted from practically dead center from one extreme position to the other. This gives an operationally safely supported extreme position of the flap especially in the horizontal position. This link arrangement augments the flap retaining forces for the flap 17 (FIG. 1) or flaps 27, 28 (FIGS. 3-3C and 5) in the respective extreme position sufficiently to eliminate the need for special locking provisions.

As will become apparent especially from FIG. 2 the at least one actuating device in the form of a hydraulically or pneumatically operated ram 19 can be embedded in a thermally insulating casing liner 24. It can advantageously be arranged also on the shield wall 7, or as here shown, laterally in the annular inlet section 4. Although this is not shown in FIG. 2 it will be helpful to provide such actuating device 19 for valve an flap operation on the shield wall 7 and also within the annular inlet section 4, on that side which lies opposite the pneumatically or hydraulically operated ram 19. As will likewise be seen from FIG. 2 the respective ram or rams 19 can preferably be arranged on locally straight-walled, coaxially arranged wall sections of the shield wall 7.

Using like reference numerals for essentially like or practically unchanged components as shown in FIGS. 1-1E and 2, FIGS. 3-3C and 4 to 6 illustrate an advantageous alternative embodiment of the invention, in which flaps 27, 28 are arranged on two upstream—top and bottom in this figure—oppositely arranged extreme sections of the shield wall 7 for movement about pivot axes 25, 26 extending transversely to the engine centerline A. When on the inlet side the inlet section 4 (FIGS. 3 and 4) is locally opened and the sleeve valve 29 in its first extreme position is deployed into the shield wall 7, or upstream into the intake duct 8, these flaps frontally close the latter lid-fashion and in symmetrically pointed configuration to keep out the ram air flow "St".

Figure 5:
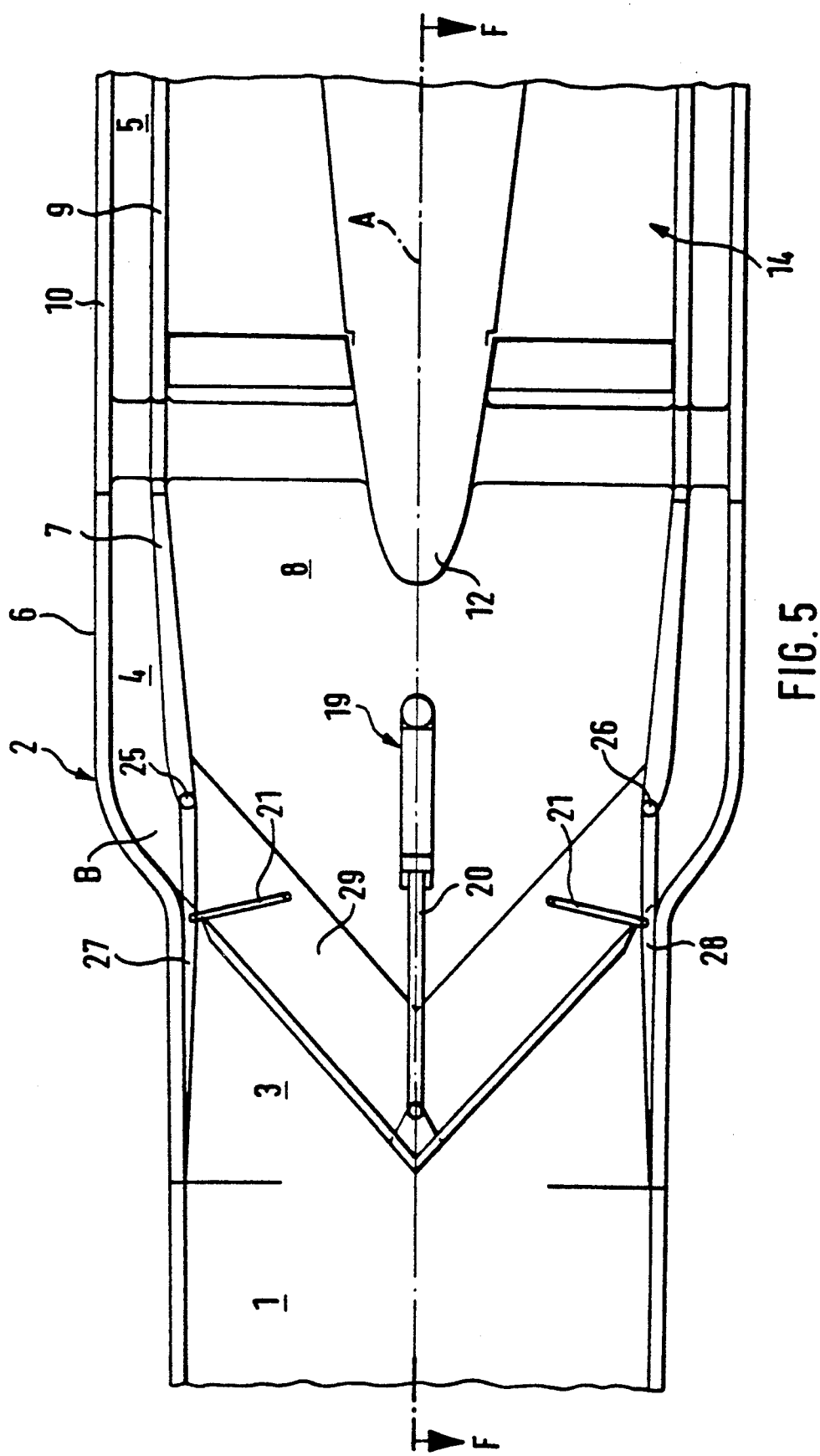
FIG. 5 is a further elevation view of the embodiment shown in FIGS. 3 and 4, modified from FIG. 3 by illustrating a second extreme position of the shutoff apparatus in which, with the air supply to the basic turbojet engine being enabled, the ram air supply to the annular inlet section of the ram air duct is shut off.
Figure 6:
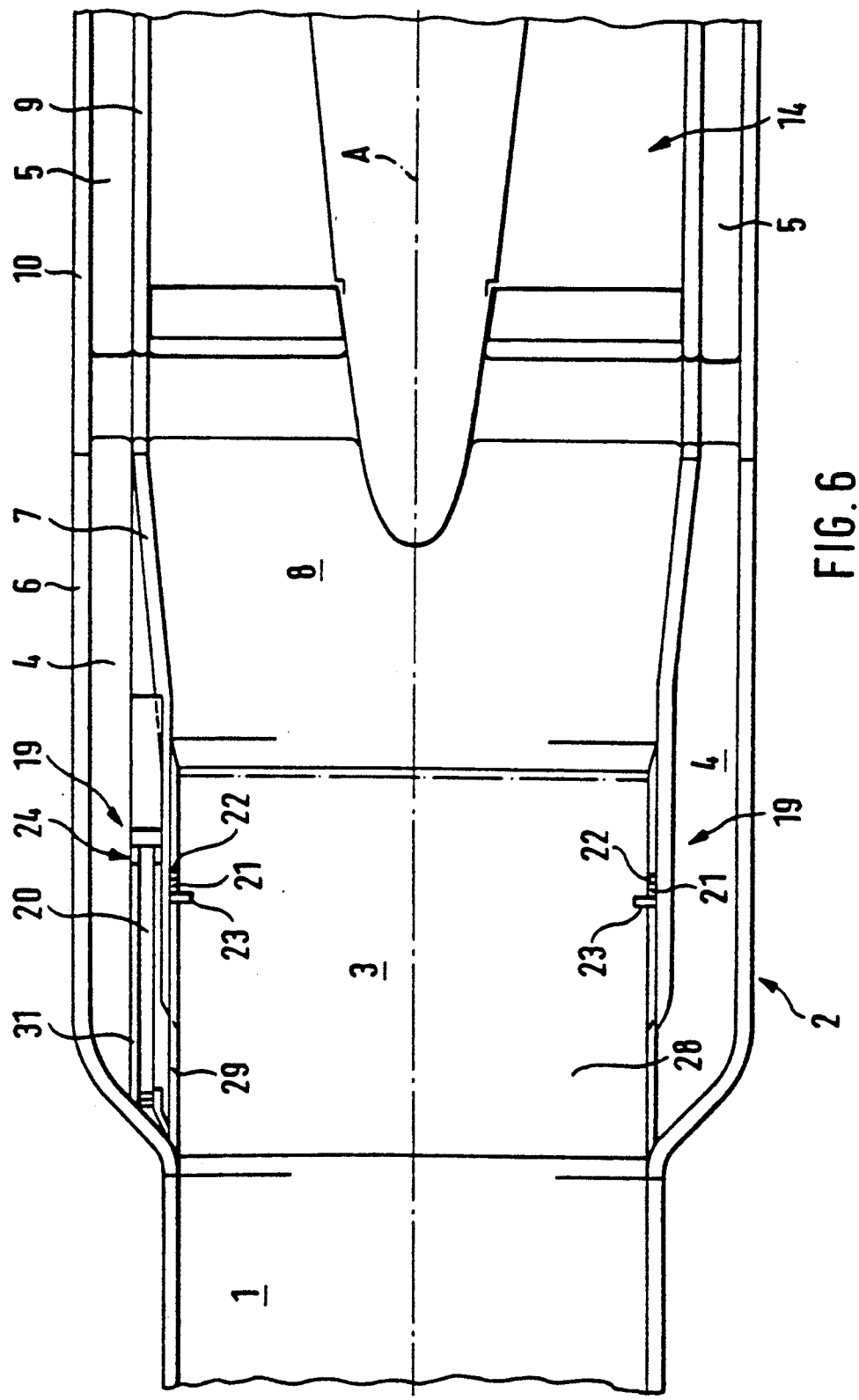
FIG. 6 is a longitudinal and transverse sectional view taken along line F—F of FIG. 5 illustrating the shutoff apparatus in a second extreme position, plus details of the actuating and adjusting apparatus for the flaps plus sleeve valve.

In accordance with FIGS. 5 and 6 of this embodiment of the present invention, the flaps 27, 28 are pivoted into an approximately horizontal position and the sleeve valve 29 is simultaneously moved axially to the second extreme position to shutoff the inlet end of the inlet section 4.

Figure 3:
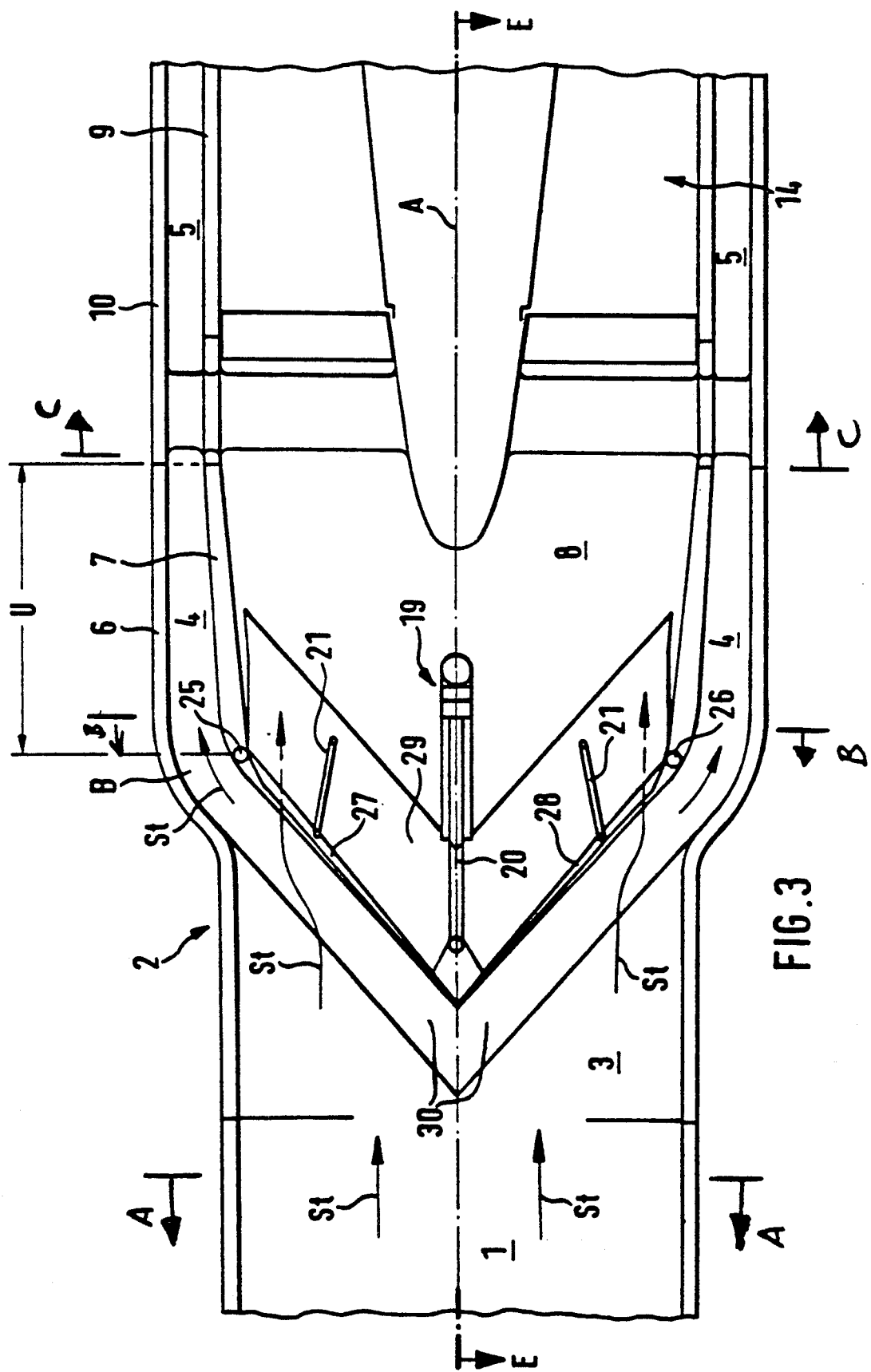
FIG. 3 is an elevation view illustrating an alternative embodiment to that of FIGS. 1 and 2 with an air tract, between a duct-like inlet flow end and the air inlet end of a turboramjet engine, and with shutoff apparatus including two flaps plus sleeve valve in a first extreme position with basic engine shutoff and exposed annular inlet section of flow duct.
Figure 3A:
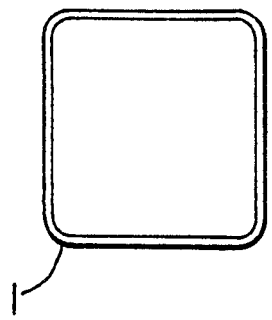
FIG. 3A is a schematic partial sectional view taken along line A—A of FIG. 3.
Figure 3B:
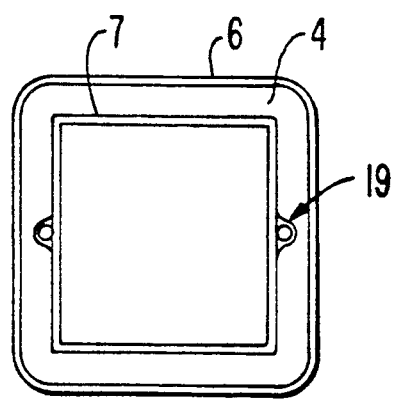
FIG. 3B is a schematic partial sectional view taken along line B—B of FIG. 3.
Figure 3C:
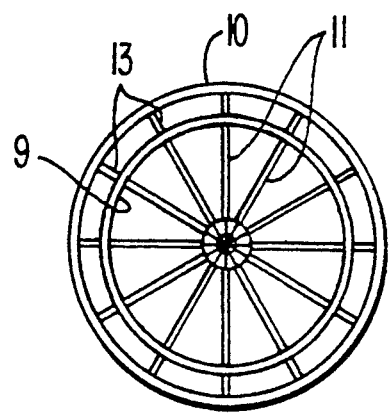
FIG. 3C is a sectional view taken along line C—C of FIG. 3.

It will also become apparent especially from FIGS. 3-3C that the quadrilateral section 3 of the air tract 2 forms inflow sections 30 of the inlet section 4 symmetrically expanding in V-shape in a downstream direction, between downstream wall ends of the duct section 3 or adjoining immediately thereto on the inlet side the beginning of the wall of the bulge of the outer casing 6, which expands from that point, and axially adjacent, laterally outer wall end edges of the sleeve valve 29 and the flaps 27, 28 folded lid-fashion. This arrangement and design of the spread, now V-shaped inlet sections 30 harmonizes with the first extreme position of the sleeve valve 29 and the flaps 27, 28 now frontally pivoted against the valve, which is their position for ramjet operation with the basic turbojet engine shut off.

In accordance with FIG. 3, bevelled location and faying surfaces for the flaps 27, 28 folded to form a lid-like closure are formed laterally of oppositely arranged frontal areas of the valve 29 to suit the V-shape of the inflow sections 30 of the inlet section 4; while the ram air inlet to inlet section 4 is opened all around and the flaps 27, 28 are swept by the flow in both transverse and axial directions.

Figure 4:
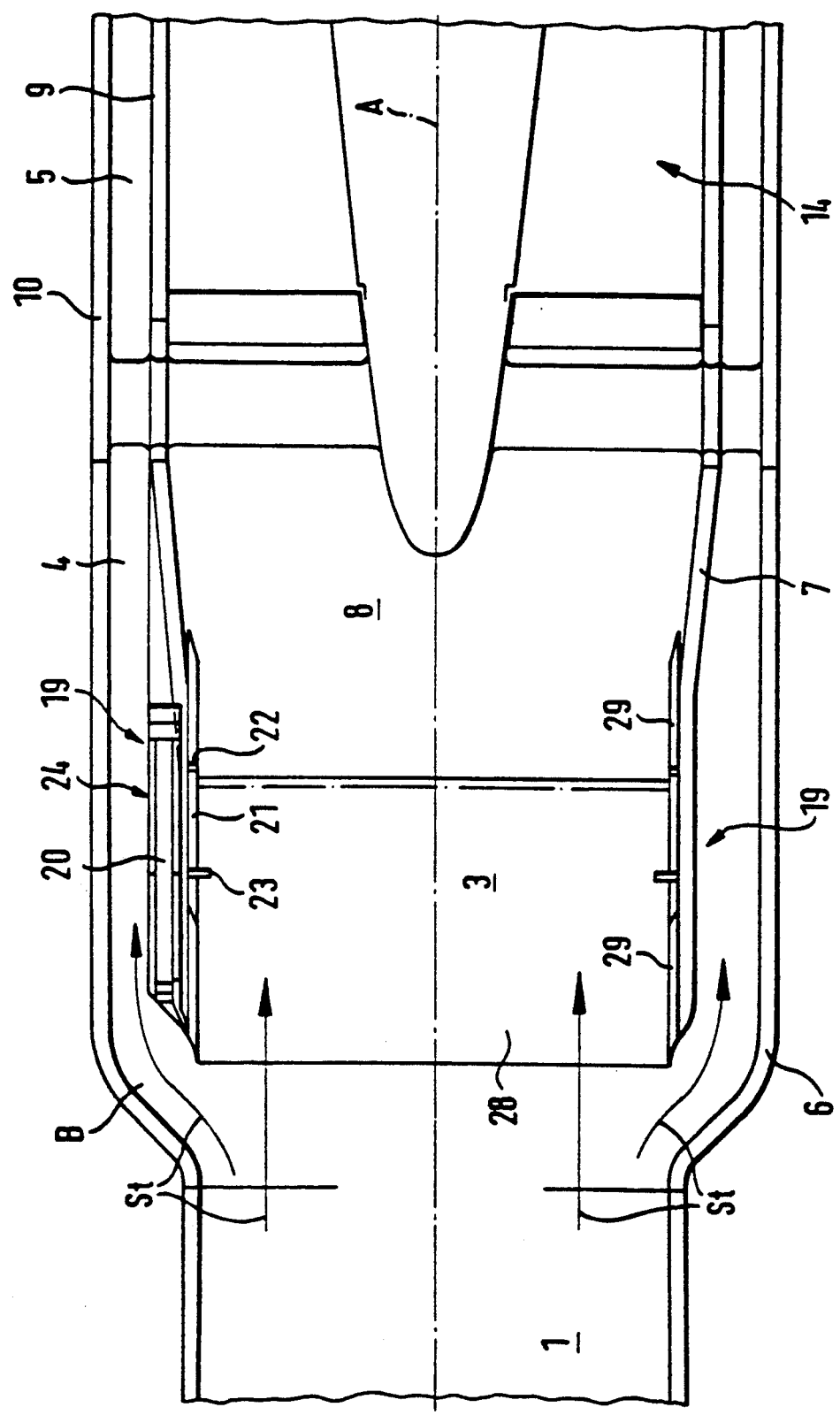
FIG. 4 is a longitudinal and transverse sectional view of the embodiment of FIG. 3, taken at line E—E, showing the first extreme position of the shutoff means illustrated in FIG. 3.

Also with the embodiment of FIGS. 3 to 6, use can be made again of hydraulically or pneumatically operated rams 19 to actuate the sleeve valve 29 and two flaps 27 and 28 in an arrangement and construction as previously discussed in light of FIGS. 1 and 2. The rams 19 should then again be arranged, together with the respective push-pull rod-like actuating members 20, in a central longitudinal or transverse plane on the air tract 2, with the respective actuating member 20 acting frontally on the sleeve valve 29; and the sleeve valve 29 can again be coupled to one flap 27, 28 each through the links 21. The action and arrangement of the links are practically the same as previously described more fully in light of FIGS. 1 and 2. With reference to FIG. 4 now, only a single ram 19 is shown on one side on the shield wall 7 in the inlet section 4, but another such ram 19 is to be here arranged again on the opposite side on the shield wall 7 in the inlet section 4.

In accordance with FIGS. 4 and 6, the respective links 21 are each hinged on mutually opposite sides of the central intake section 8 to the sleeve valve 29 through pivot pins 22 on the one side and to the lower flap 28—as here shown by way of example—through pivot pin 23 on the other side.

As will clearly be seen also from FIG. 6, the push pull rod-like actuating member 20 of the ram 19 can optionally be integrated into a lining section 31 which moves along with the sleeve valve when the latter is actuated.

On both the embodiment illustrated in FIGS. 1 and 2 and the embodiment described in light of FIGS. 3 to 6, the annular inlet section 4 of the air tract forms, along a transitional region "U" changing from a rectangular or square section to a circular cylindrical final section, a generally narrowing inlet of diminishing flow area to the ram air duct 5. In conjunction with this transitional region "U" this includes—depending on the sectional representation—wall profiles in the upstream portion of 4 (FIG. 6) of consistent flow area (between 6 and 7) and (FIG. 5) of locally continuously narrowing wall profiles (between 6 and 7) when looking downstream.

In a further aspect of the present invention at least one flap 17 (FIGS. 1 and 2) or the flaps 27, 28 (FIG. 5) is/are advantageously tapered—in an axial upstream direction—in an essentially wedge-like manner in terms of wall thickness. In this manner the two flaps 27, 28 (FIG. 5) form, together with immediately adjacent extreme sections of the shield wall 7, a duct structure which converges in the direction of the intake air flow in the intended second extreme position of the flaps and sleeve valve 29, i.e. in an extreme position in which they have been pivoted approximately horizontally against adjacent wall sections of the quadrilateral duct section 3 of the air tract 2. This similarly applies to the embodiment of FIGS. 1 and 2 in conjunction with the horizontally pivoted flap 17 together with the face end of the shield wall 7 on the pivot axis side.

As will be seen especially from the alternative embodiment of FIGS. 3 and 5, the sleeve valve 29 can be designed as a V-shape to suit the V-shape inlet flow sections 30. In other words, the sleeve valve 29 forms a lateral wall profile which opens up in V-shape, looking downstream. Conceivably the respective sleeve valve 29 can optionally have a straight wall at the, e.g., laterally opposite aft ends or aft edges, i.e. an extreme wall extending normal to the extended centerline A of the engine.

Figure 7:
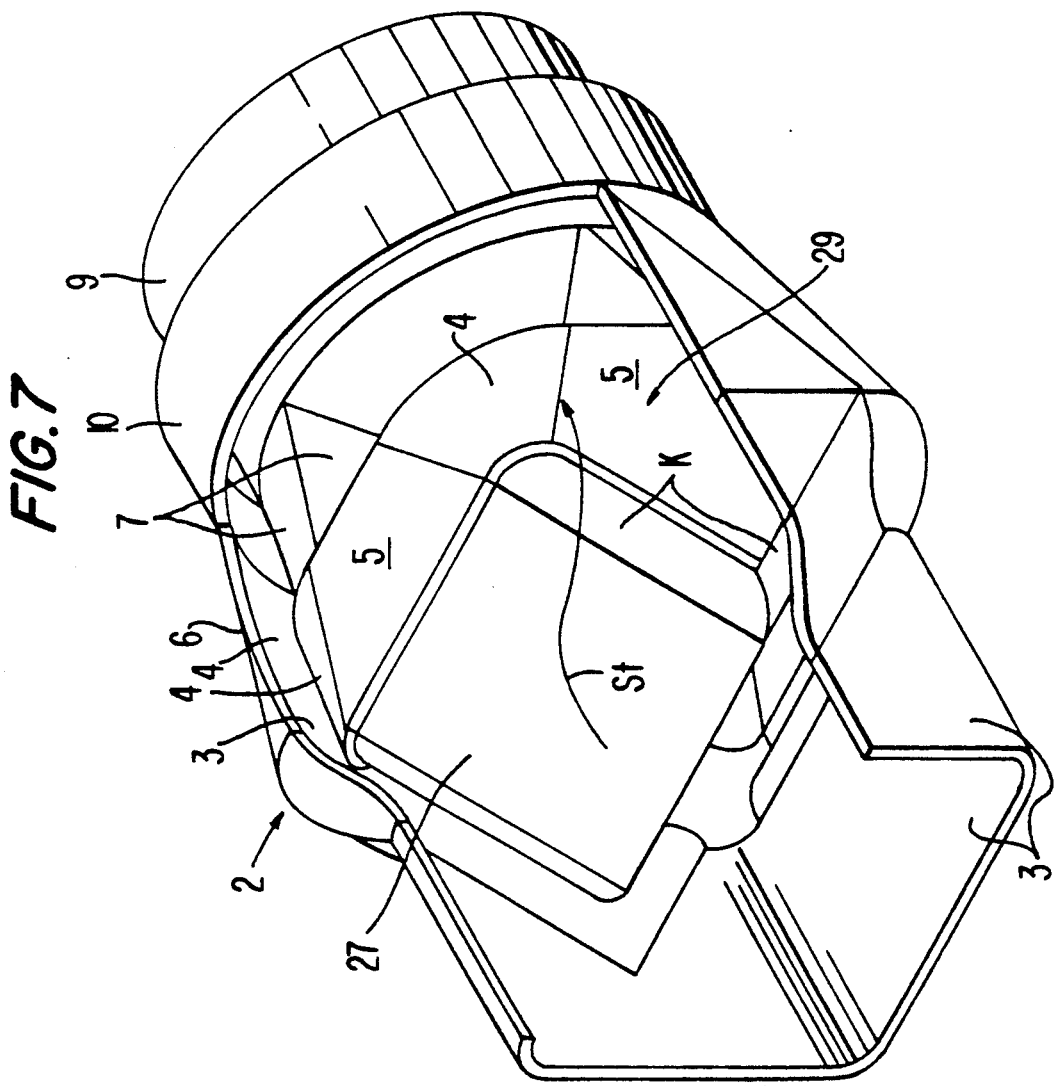
FIG. 7 is a perspective view of the arrangement according to FIGS. 3, 5, and 6, with the valve members in a first extreme position.

FIG. 7 is a perspective view of the arrangement according to FIG. 3, 5, and 6 with the first extreme position of valve 29 and flaps 27, 28, the flaps being frontally pivoted to shut off ram air flow into the basic turbo engine. The flaps 27, 28 are square or rectangular shape including laterally rounded sections K, leading parts St of the ram air with low flow losses flowing smoothly over the sections K and from there into the inlet duct 4 of the ramjet air duct 5.

Figure 8:
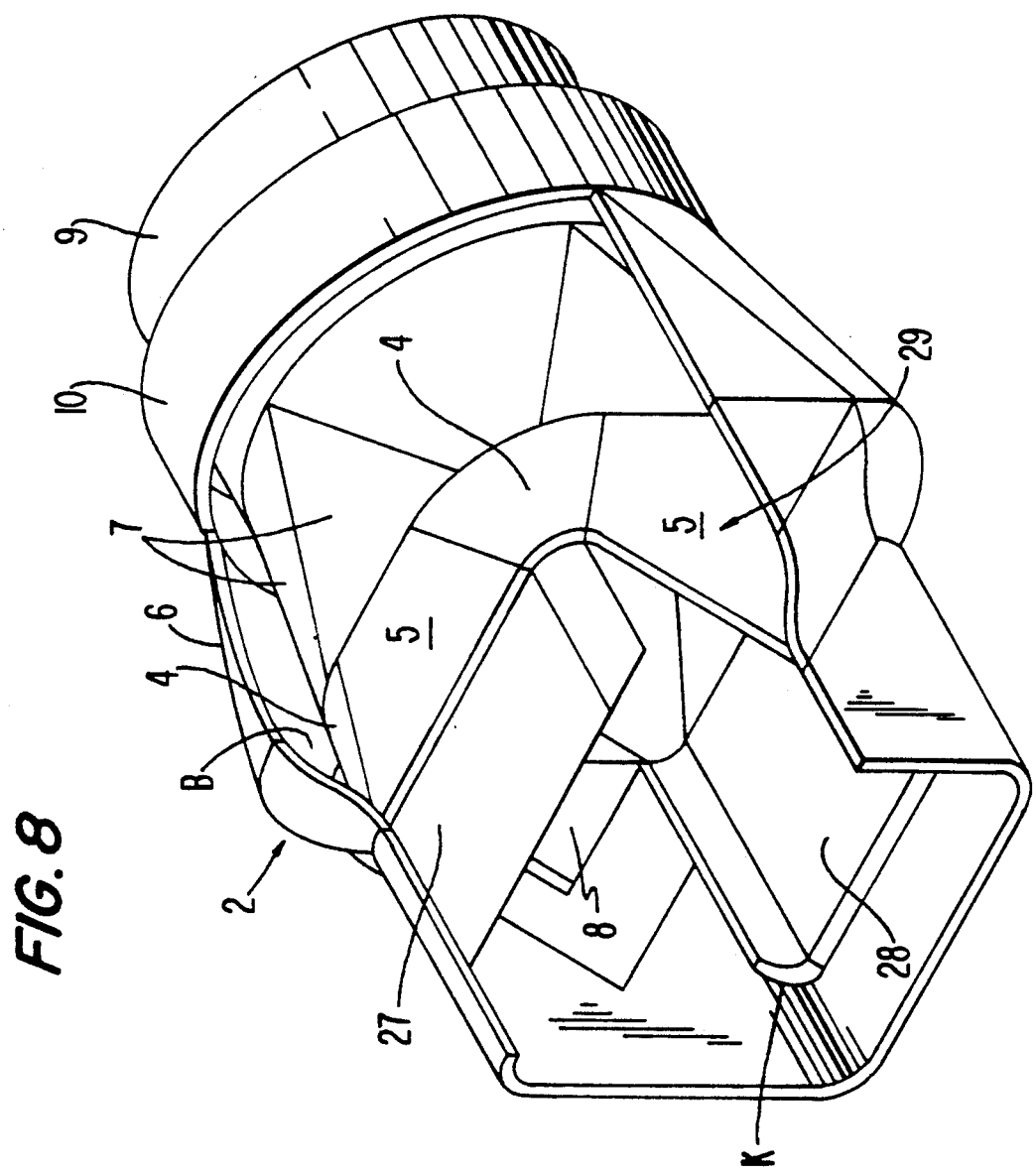
FIG. 8 is a view similar to FIG. 7, but with the valve members in a second extreme position.

FIG. 8 shows the arrangement of FIG. 7, but with the valve 29 and flaps 27, 28 in the second extreme position. In this second extreme horizontal position of flaps 27, 28, 29 closes a circumferentially extending aperture or inlet into duct 4, the inlet including the V-shaped and laterally extending sections 30 (FIGS. 3-3C). FIGS. 7 and 8 differ from the embodiment as shown in FIGS. 3-6 in that sleeve valve 29 according to the invention is axially movable along the outer circumferential front region of intake duct 8 (shield wall 7). As shown in FIGS. 7 and 8, the valve 29 is a square rectangular ring, including rounded wall sections W and straight wall sections S oppositely arranged and emerges into V-shaped to close the V-shaped inlet section 30 (see FIGS. 5 and 8).

In a further aspect of the present invention the sleeve valve 16 (FIGS. 1 and 2) or 29 (FIGS. 3 to 6) on the one side and one or both flaps 17 and 27, 28, respectively, are controlled independently of each other by separate actuating and operating means. During the changeover phase the respective air inlet flow areas to the turbojet engine and to the ram air duct (ramjet engine) can in this manner be controlled independently of each other. This may afford a welcome advantage, depending on the engine design, in the flight missions to be executed and engine load conditions anticipated e route. The annular inlet section to the ram air duct may thus be essentially in the already open position while the turbojet air inlet duct area is not yet closed or is closed flap-fashion by only a very small amount in terms of flow area. In analogical application, however, said effect is already largely achieved in a practicable manner by said previously described and illustrated embodiment of FIGS. 1 and 2 and also of FIGS. 3 to 6, such that during a changeover phase from turbojet to ramjet operation, relatively large air inlet flow areas can be made available very fast for ramjet operation, while flap actuation lags behind a little and allows sufficient latitude to still provide sufficient air in this changeover phase for continuously progressive shutdown of the basic turbojet engine.

A basic turbojet engine suitable for application under the present invention includes, from left to right and in this order, of a multiple-stage axial-flow compressor, an annular combustion chamber immediately followed at the hot-gas end by a turbine to drive said compressor. In combination with a ramjet engine, it is assumed that the annular ram air duct 5 issues, at a point downstream of the hot gas exit from the turbine of the basic turbojet engine, into an exhaust pipe extending concentrically with the engine centerline, with an afterburning device (supersonic operation) and an additional combustion chamber (hypersonic operation) downstream of same. For ramjet operation, therefore, also the basic turbojet engine must be shut off from the hot gas at its downstream end. For this purpose, an axially movable sleeve valve may be provided, as perhaps a sleeve valve which at the downstream end of the engine shroud can be moved axially against a centerbody to shut off the hot gas exit and thus the basic engine from the ram air flow also in a rearward direction. In accordance with the present invention it will be advantageous to suitably harmonize the respective changeover phases with the hot gas valve actuation by means of one or several flaps plus sleeve valve as previously described.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Turboramjet engine having a variable air intake, a ram air duct annularly enveloping the basic turbojet engine, and shutoff means to energize the ram air duct with air when the basic turbojet engine is shut off, wherein an air tract which communicates with the air intake and is arranged on a tubular duct carried axially towards the basic turbojet engine is expanded to an annular inlet section of the ram air duct, wherein the shutoff means are associated with quadrilateral sections of the tubular duct which are quadrilateral at least on the inlet side, and wherein the shutoff means of the annular inlet section are represented by an axially adjustable, internally swept sleeve valve and at least one flap which can be pivoted against a partial inlet of the inlet section, said at least one flap closing off the sleeve valve lid-fashion in a jointly exposed position of the annular inlet section.

2. Engine of claim 1, wherein the at least one flap is pivotably arranged on an upstream extreme section of a shield wall forming a flow divider between the one upstream section of the tubular duct and the annular inlet section, the pivotal movement of the at least one flap being about a pivot axis extending transversely to the engine centerline, wherein upstream lateral ends of the shield wall, frontal face ends of the sleeve valve, and ends of the duct section in the air tract axially adjacent to said ends of th shield wall, are bevelled at the same angle of inclination relative to the engine centerline, and wherein the sleeve valve is fully deployed into the shield wall when the at least one flap closed in inclined lid-fashion and the ram air supply to the annular inlet section is maximally opened.

3. Engine of claim I, wherein said at least one flap includes two flaps arranged on upstream, oppositely arranged extreme sections of the shield wall for pivotal movement about pivot axes extending transversely to the engine centerline, said flaps frontally closing off the sleeve valve in lid-fashion and symmetrically pointed configuration from the ram air flow when the annular inlet duct is locally opened at the inlet end while the sleeve valve is in its first extreme position, where it is fully deployed into the shield wall, and which in their approximate horizontal position, together with the sleeve valve in its second extreme position, locally shut off the annular inlet section at its inlet side.

4. Engine of claim 1, wherein one upstream section of the tubular duct forms inlet flow sections of the annular inlet section between its downstream wall ends and axially adjacent wall end edges of the sleeve valve and the flaps folded lid-fashion, which expand in the downstream direction in symmetrical V-shape, and wherein the sleeve valve is designed to suit said V-shape of the inlet flow sections and exhibits bevelled location and faying surfaces for the flaps to be pivoted against them, said flaps being swept by the flow axially and transversely when the ram air supply to the inlet section is enabled all around.

5. Engine of claim 1, wherein at least one actuating device in the form of a hydraulically or pneumatically operated ram is provided for operating the sleeve valve and the at least one flap, said ram, together with a push-pull rod-like actuating member being arranged in a longitudinal or transverse central plane on the air tract, and wherein the actuating member acts frontally on the sleeve valve, which is coupled to the at least one flap through links.

6. Engine of claim 5, wherein at least one of said links is provided hinged to the sleeve valve on the one side and to one of said flaps on the other side with pins such that when the shutoff means are actuated, they can be pivoted from one extreme position into another from very nearly dead center.

7. Engine of claim 5, wherein the at least one actuating device is embedded in a thermally insulating casing liner and is arranged within the annular inlet section on the shield wall, wherein a push-pull rod-like actuating member is integrated into a liner section which follows the actuating movement.

8. Engine of claim 1, wherein the annular inlet section forms, along a transitional region from a rectangular or square section to a circular cylindrical extreme section, a narrowing inlet portion to the ram air duct of reducing overall flow area, and wherein it is formed between sectionally continuously narrowing or initially parallel and then narrowing structures of the shield wall and an outer casing.

9. Engine of claim 1, wherein at least one flap is tapered in essentially wedge shape with respect to flap thickness such that when the annular inlet section is in approximately horizontal shutoff position pivoted against the respective wall section of the quadrilateral duct section of the air tract, it forms, together with the extreme sections of the shield wall adjoining them on the side of the flap pivot axes, a duct structure converging along the direction of intake air flow.

10. Engine of claim 1, wherein the air tract for the annular intake section takes the shape of a dual casing, where the outer casing uniformly expands all around from the upstream quadrilateral duct section to the outer diameter of the overall engine in the manner of a slipover sleeve and, with the inner shield wall and including the annular inlet section to the ram air duct, turns into circular cylindrical casing sections connecting the air tract frontally to an inner shroud of the basic turbojet engine and to an outer wall for the ram air duct, both and being concentric with the engine centerline.

11. Engine of claim 1, wherein the sleeve valve exhibits a polygon shaped cross-section corresponding to adjacent duct wall structures.

12. Engine of claim 1, wherein the sleeve valve on the one hand and the at least one flap on the other are each independently controlled by means of separate actuating and operating means.

13. Engine of claim 3, wherein one upstream section of the tubular duct forms inlet flow sections of the annular inlet section between its downstream wall ends and axially adjacent wall end edges of the sleeve valve and the flaps folded lid-fashion, which expand in the downstream direction in symmetrical V-shape, and wherein the sleeve valve is designed to suit said V-shape of the inlet flow sections and exhibits bevelled location and faying surfaces for the flaps to be pivoted against them, said flaps being swept by the flow axially and transversely when the ram air supply to the inlet section is enabled all around.

14. Engine of claim 3, wherein at least one actuating device in the form of a hydraulically or pneumatically operated ram is provided for operating the sleeve valve and the at least one flap, said ram, together with a push-pull rod-like actuating member being arranged in a longitudinal or transverse central plane on the air tract, and wherein the actuating member acts frontally on the sleeve valve, which is coupled to the at least one flap through links.

15. Engine of claim 3, wherein the sleeve valve on the one hand and the at least one flap on the other are each independently controlled by means of separate actuating and operating means.

16. Engine of claim 3, wherein the sleeve valve on the one hand and the at least one flap on the other are each independently controlled by means of separate actuating and operating means.

17. Engine of claim 14, wherein the sleeve valve on the one hand and the at least one flap on the other are each independently controlled by means of separate actuating and operating means.

18. An air intake control arrangement for a turboramjet engine of the type having a turbojet air intake surrounded by a ramjet air intake, comprising:

an axially adjustable sleeve valve movable between a ramjet operation position with a annular opening surrounding the sleeve valve and a turbojet operation position with said annular opening being at least partially closed off by the sleeve valve, and at least one pivotal flap valve movable between a ramjet operation position closing the central area of the sleeve valve and a turbojet operation position opening the central area of the sleeve valve and closing said annular opening, wherein said sleeve valve exhibits a quadrilateral shape which cooperates with a corresponding quadrilateral shape of an air intake duct of the engine.

19. An air intake arrangement according to claim 18, wherein said at least one pivotal flap consists of a single quadrilateral flap which is pivotally mounted at one side of the sleeve valve.

20. An air intake arrangement according to claim 18, wherein said at least one pivotal flap consists of two quadrilateral flaps which are pivotally mounted at respective opposite sides of the sleeve valve.

* * * * *